United States Patent [19]

Walter et al.

[11] 4,188,499
[45] Feb. 12, 1980

[54] PURIFICATION OF ALCOHOL

[75] Inventors: Thomas J. Walter, Baton Rouge; Sebastian M. Laurent, Greenwell Springs, both of La.

[73] Assignee: Ethyl Corporation, Richmond, Va.

[21] Appl. No.: 855,269

[22] Filed: Nov. 28, 1977

Related U.S. Application Data

[63] Continuation of Ser. No. 678,148, Apr. 19, 1976, abandoned.

[51] Int. Cl.² .............................................. C07C 29/24
[52] U.S. Cl. ..................................... 568/914; 568/903; 568/916
[58] Field of Search .................... 260/643 F; 568/914, 568/916

[56] References Cited

U.S. PATENT DOCUMENTS

| 3,821,266 | 6/1974 | Mulder et al. | 252/463 |
| 3,855,320 | 12/1974 | Lesch et al. | 260/643 B |

Primary Examiner—Joseph E. Evans
Attorney, Agent, or Firm—Donald L. Johnson; John F. Sieberth; Paul H. Leonard

[57] ABSTRACT

Primary alcohol containing impurities which have internal hydroxyl groups is purified to cause removal of such internal hydroxyl groups with reduced formation of ethers by treating the impure alcohol with an alumina catalyst which has been contacted with a hydroxide of a Group 1-A element. Preferably the alcohol treatment is concurrent with or followed by a hydrogenation treatment the purpose of which is to improve the iodine number of the treated alcohol.

15 Claims, 1 Drawing Figure

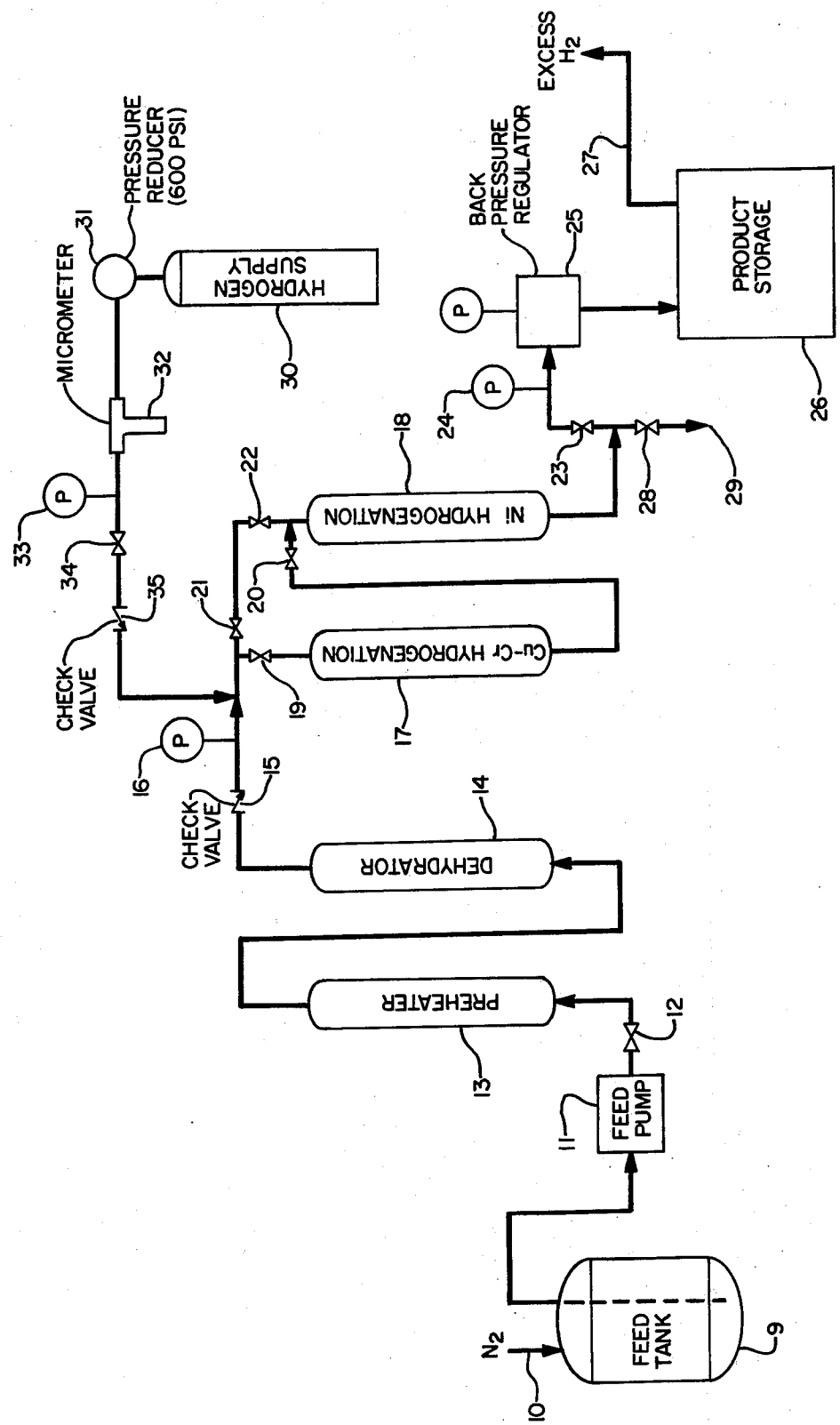

4,188,499

PURIFICATION OF ALCOHOL

This is a continuation of application Ser. No. 678,148 filed on Apr. 19, 1976, now abandoned.

BACKGROUND OF THE INVENTION

1. Field of the Invention

This invention relates to the purification of alcohol selectively to remove internal hydroxyl groups such as those of the bivalent radial ($>$CHOH) while leaving substantially unaffected the primary or terminal hydroxyl groups such as those of the monovalent radical (—CH$_2$OH).

2. Description of the Prior Art

The basic concept of purifying alcohol selectively to remove secondary hydroxyl groups is set forth by Wikman et al in U.S. Pat. No. 3,468,965. The purification is described as a selective dehydration of internal hydroxyl groups and preferably is followed by a mild hydrogenation to saturate unsaturated linkages, such as olefinic double bonds, resulting from or carried through the dehydration step. The process of U.S. Pat. No. 3,468,965 provides purification to meet the sulfate paste odor problem. The present invention seeks to provide an even further reduction of the content of molecules having internal hydroxyl groups. One of the catalysts described in U.S. Pat. No. 3,468,965 is a silicated alumina catalyst. As will be explained in greater detail hereinafter, the present invention uses an alumina catalyst which has been treated with a hydroxide of a Group 1-A metal, e.g. sodium hydroxide. The resulting catalyst provides an improved dehydration treatment wherein diols are eliminated to a high degree without producing excessive quantities of ethers. The present invention provides a process wherein the catalyst is easier to prepare than catalysts which require calcining such as the calcium oxide on alumina catalysts of U.S. Pat. No. 3,855,320.

SUMMARY

The present invention relates to the dehydration of alcohol molecules especially those containing the divalent radical ($>$CHOH). This radical is readily recognized as the fundamental structure of secondary alcohols such as 2-decanol, 3-dodecanol, 4-dodecanol, 4-tetradecanol and the like. Such dehydration can be desirable in a number of different ways. As an example, secondary alcohol can be converted to olefin, also diol having the divalent radial ($>$CHOH) and the radical (—CH$_2$OH), the latter being recognizable as the primary alcohol structure, can be selectively dehydrated to produce olefinic primary alcohol. Similarly, primary mono alcohol contaminated with a minor amount of diol having the radicals ($>$CHOH) and (—CH$_2$OH) can be purified in regard to the ($>$CHOH) radicals.

Accordingly, it is an object of the present invention to provide a process for treating alcohol containing at least an impurity amount of radicals of the type ($>$CHOH) to provide a product having a lesser amount of ($>$CHOH) radicals.

Another object of the present invention is to provide a process for dehydrating alcohol containing the radicals (—CH$_2$OH) and ($>$CHOH) to provide an alcohol product having a lesser amount of ($>$CHOH) radicals.

Another object of the present invention is to provide a process for purifying alcohol containing the radicals (—CH$_2$OH) and ($>$CHOH), at least some alcohol molecules present having both radicals present therein, to provide a product having a lesser amount of ($>$CHOH) radicals.

Another object of the present invention is to provide a process for treating predominantly primary alcohol containing the radical (—CH$_2$OH), at least some molecules present having in addition to the (—CH$_2$OH) radical, a radical of the type ($>$CHOH), to provide a product having a lesser amount of ($>$CHOH) radicals.

Another object of the present invention is to provide a process for purifying predominantly primary alkanol containing the radical (—CH$_2$OH) and some radicals of the type ($>$CHOH) obtained by hydrolyzing an air-oxidized mixture of aluminum alkyls produced by growing aluminum triethyl in the presence of ethylene to provide an alcohol product with reduced quantities of dihydroxy compounds having ($>$CHOH) radicals.

The foregoing objects are attained by contacting the alcohol at a temperature of from about 200° to about 300° C., preferably from about 215° to about 260° C., in the liquid phase with an alumina catalyst which has been treated with an alkali metal hydroxide.

Other and further objects and features will become apparent from consideration of the following discussion.

In the process of the present invention, the radical ($>$CHOH) is dehydrated, preferentially or selectively when in admixture with (—CH$_2$OH) radicals, to produce olefinic molecules which may be retained as such or may be hydrogenated to produce saturated materials of low iodine value. An important overall result is that diol containing both the ($>$CHOH) and (—CH$_2$OH) radicals can be converted to saturated primary alcohol having only the (—CH$_2$OH) hydroxyl containing radicals. This result is of importance because synthetic alcohol, especially as produced by processes such as the Ziegler process of U.S. Pat. No. 2,892,858 or the oxo process reaction of olefin, CO and hydrogen, contains diol impurities which have adverse effect in connection with some uses of the alcohol.

Preferably the alcohol is subjected to hydrogenation concurrently with the treatment or subsequent thereto to reduce the iodine value of the alcohol. Preferably the hydrogenation is subsequent to the treatment and is with a nickel catalyst at a temperature of from about 115° to about 140° C., preferably from about 120° to about 130° C., and a pressure of from about 300 to about 500 psig. Preferably the amount of alkali metal hydroxide used in the contacting of the alumina catalyst is at least enough to inactivate a substantial portion of the active acid sites of the alumina. Preferably the alkali metal hydroxide is sodium hydroxide or potassium hydroxide. Preferably the alumina catalyst treated is of the gamma alumina type. Preferably the alcohol treated has from about 4 to about 30 carbon atoms per molecule, an even more preferred range being from about 6 to about 24 carbon atoms per molecule, especially from about 10 to about 18 carbon atoms per molecule.

BRIEF DESCRIPTION OF THE DRAWING

The single FIGURE of the drawing shows a typical continuous process for treating alcohols in accordance with the present invention using catalyst prepared in accordance with the present invention. The process is primarily a two-step operation of a treatment step followed by a hydrogenation step.

DESCRIPTION OF PREFERRED EMBODIMENTS

The thermal treatment of diol contaminated primary alcohol with ordinary alumina catalysts is characterized by the formation of excessive amounts of ethers which possibly arise through the dehydration of primary alcohol and intermolecular combinations according to the reaction:

$$2ROH \rightarrow ROR + H_2O$$

Such side reactions are minimized by pretreating the alumina catalyst with alkali metal hydroxide. It is theorized that the acidic sites of the alumina are inactivated by alkali metal atoms so that the catalyst is less active for the undesired etherification side reaction.

The use of alkali metal hydroxide for this purpose is particularly desirable because of the solubility of alkali metal oxide or hydroxide in water which facilitates thorough contacting of the alumina by simple aqueous solutions as well as the ready removal of excess alkali metal hydroxide by water washing of the treated alumina. After washing, residual water is removed, typically by drying overnight in a vacuum oven. The treated alumina catalyst is usable directly without the calcination treatment which is a necessary step when organic salts such as calcium acetate are used and converted to oxide.

Although rates and extent of modification may vary, the treatment of the alumina with the alkali metal hydroxide solution is not critical in regard to time, concentration of the aqueous solution of the hydroxide, ratio of alkali metal hydroxide to alumina, or temperature. In general, one uses enough hydroxide to react with all or some desired fraction of the active sites of the alumina and allows adequate time for this reaction to occur. Suitable temperatures range from about −50° to about 150° C., preferably from about 0° to about 75° C., typically at room temperature or about 25°–30° C. The time for the contact of the alumina with alkali metal hydroxide solution ranges from about 10 minutes to about 24 hours, preferably from about 1 to about 10 hours.

Alkali metal hydroxide solutions useful range from about 0.01 to about 10 normal, or higher, even saturated solutions. Concentrations from about 0.1 to about 5 normal are preferred.

Usually the alumina is treated in a container with at least enough alkali metal hydroxide solution to cover the alumina without requiring recirculation of the solution or agitation of the alumina thereby minimizing abrading of the alumina particles. Larger amounts of hydroxide solution may be used; however, a convenient ratio is about 2 volumes of aqueous alkali metal hydroxide solution per volume of alumina.

After the treatment of the alumina with the alkali metal hydroxide, residual free alkali metal hydroxide is preferably removed from the alumina by washing the alumina with water. Subsequently the washed treated alumina is dried thoroughly to remove the residual water. Typically drying the alumina overnight in a vacuum oven at 110° C. provides adequate moisture reduction; however, this is not critical, other temperatures from about 0° to about 200° C. being useful with appropriate times and pressures.

Alumina so treated is ready for use immediately without need for calcining or conversion of residual alkali metal hydroxide into an oxide or the like.

The alumina catalyst treatment in accordance with the present process permits a retention of useful effectiveness in diol conversion while it significantly reduces the tendency toward the formation of ethers.

Temperatures used for the treatment of alcohol using the catalysts of the present invention, although important for optimum results, are not especially critical and range from about 200° to about 300° C., preferably from about 215° to about 260° C. In general, the diol conversion improves at the higher temperatures; however, the formation of by-products, e.g. ethers, and hydrocarbons also increases and the best compromise is selected by routine experimentation on a basis of the procedures described herein. Usually as the catalyst ages it is desirable to increase the treatment temperature slightly to maintain the diol conversion rate.

The dehydration process of the invention is preferably followed by a mild hydrogenation treatment, preferably in a subsequent step to saturate olefinic linkages resulting from the dehydration providing alcohols having a low iodine value. Such a hydrogenation is typically performed with a supported or pelletized nickel hydrogenation catalyst at a temperature of from about 115° to about 140° C., preferably from about 120° to about 130° C., typically at 121° C.

As noted previously, a hydrogenation of the dehydrated alcohol may be desirable to improve the iodine value thereof. Preferably the hydrogenation is catalytic using gaseous hydrogen; however, in appropriate situations chemical reducing agents such as sodium borohydride, triisobutyl aluminum, diisobutyl aluminum hydride, sodium aluminum diethyl dihydride, alkoxides, etc. may be used.

Any suitable hydrogenation catalyst may be used, the temperature being adjusted to provide the desired reduction. without excessive destruction of primary alcohol radicals (—CH₂OH). Typical catalysts are Raney nickel, powder or pelletized supported nickel, copper chromite or the like. Such catalysts may be in powder, pelletized, supported or other suitable form.

In general, it is preferred to perform the reduction or hydrogenation in a separate vessel from that used for the dehydration thereby permitting separate optimization of temperature.

Typical hydrogenation temperature is 121° C. when using a typical nickel catalyst such as Ni-0104-T-⅛″ pellets made by Harshaw or 182° C. when using a typical copper chromite catalyst such as Harshaw Cu-1107T.

In addition to the foregoing hydrogenation operation, other unit operations may be used in appropriate instances to remove impurity from the alcohol after the dehydration treatment. Such operations include distillation, absorption, adsorption, fractional crystallization, and the like, and may be used in combination or in combination with the hydrogenation as previously discussed.

The process of the present invention is suitably conducted batchwise or in a continuous flow manner, exemplary data for both types being provided in the examples that follow.

A wide variety of alcohol can be treated in accordance with the principles of the present invention, including natural source alcohol as well as synthetic alcohol.

In batch treatment of alcohol in accordance with the dehydration step of the present process, catalyst and alcohol are simply placed in a suitable container provided with means for agitation and temperature control and allowed to remain in contact for a suitable period of time ranging from about 5 minutes to about 24 hours, preferably from about 10 minutes to about 8 hours. The ratio of catalyst to alcohol is not critical and will usually range from about 0.01 to about 2 volumes of catalyst per volume of alcohol, depending in part on the percentage of free space in the catalyst. In such batch treatment the catalyst can be used repeatedly as long as it is effective and does not produce excessive ether. Depending upon the manner of inactivation and the acidity of the alcohols, catalyst which is still active for dehydration and which produces excess ether frequently can be reactivated merely by again contacting it with alkali metal hydroxide solution, washing and drying as described in connection with the initial preparation.

In the preferred continuous flow treatment, it is usually desirable to use a packed tower containing previously prepared catalyst; however, it is also possible to prepare or reactivate the catalyst while in situ in such towers by sequentially passing alkali metal hydroxide solution, wash water and a stripper fluid such as dry air or dry nitrogen through the packed tower.

With reference now to the FIGURE, the apparatus shown is a continuous flow alcohol treatment apparatus constructed in accordance with the principles of the present invention. In this apparatus, feed tank 9 provides a reservoir of feed alcohol and is connected to a nitrogen source indicated in general by line 10 and to feed pump 11. The nitrogen provides a blanket to exclude oxygen from contact with the feed alcohol. The discharge line from feed pump 11 is connected through valve 12 to preheater 13, the latter in turn being connected to dehydrator 14. Dehydrator 14 and preheater 13 are provided with suitable temperature measurement and control apparatus whereby a selected operational temperature may be maintained therein, feed alcohol preferably being brought to the desired temperature for dehydrator 14 by preheater 13 so that the alcohol temperature is substantially uniform throughout dehydrator 14. Dehydrator 14 is packed with alumina catalyst prepared in accordance with the teachings of the present application as described in further detail elsewhere herein. Dehydrator 14 is connected through check valve 15 and pressure measurement device 16 to either of hydrogenators 17 and 18 as controlled by valves 19, 20, 21, and 22. Hydrogenator 18 is connected through valve 23, pressure measurement device 24, and back pressure regulator 25, to product storage vessel 26. Product storage vessel 26 is provided with a vent 27 by means of which excess hydrogen or other gases are released. Valve 28 connected to hydrogenator 18 provides for bleeding the system through line 29 to facilitate the removal of fine particles of catalyst at startup.

The hydrogenators 17 and 18 are connected to hydrogen supply 30 via pressure reducer 31, micrometer flow control 32, pressure measuring device 33, valve 34 and check valve 35. Thus they receive a controllable amount of hydrogen and operate at readily controllable pressure. Usually an excess of hydrogen is fed so that some hydrogen leaves the system by vent 27. This vented hydrogen may be recovered and pressured back to supply 30 or used elsewhere as convenient. The hydrogenators provide mainly for the reduction of olefinic unsaturation in the effluent from dehydrator 14 using one or more catalyst systems as desired. For example, the hydrogenator 18 may be provided with a nickel catalyst bed while hydrogenator 17 may be provided with a copper chromite catalyst bed. In either event, the hydrogenators are provided with suitable temperature measurement and control devices whereby selected temperatures may be obtained in each. As a result, it is possible conveniently to vary the temperatures of the dehydrator 14 as well as the hydrogenators 17 and 18 as well as the hydrogen flow rate, the alcohol flow rate and system pressure to determine the most desirable conditions for the extent of purification required. When either of valves 19 and 20 is closed and valves 21 and 22 are open, the alcohol flow by-passes hydrogenator 17 entirely permitting the reduction to be accomplished in hydrogentor 18. Alternately, if desired, the hydrogenator 17 can be provided with a nickel catalyst bed similar to that of hydrogenator 18 so that the effective contact length and contact time of the dehydrated alcohol in what is effectively a single nickel reduction step may be extended.

Optimum hydrogenation conditions vary with different alcohols and different catalysts. Typical conditions for continuous hydrogenation with nickel catalysts such as Harshaw Ni-0104-T-$\frac{1}{8}$" pellets are 121° C., 500 psig hydrogen pressure, alcohol LHSV 1.0. Typical conditions for continuous hydrogenation with copper chromite catalysts such as Harshaw Cu-1107-T are 182° C., 500 psig hydrogen pressure, alcohol LHSV 1.5.

The following examples indicate preferred embodiments of the present invention.

EXAMPLE I 8.4 Grams of NaOH was dissolved in 500 ml water providing 0.42 normal NaOH which was added to 200 ml of Kaiser A-201 alumina. The mixture was agitated and allowed to stand overnight at room temperature. The excess NaOH solution was then removed and the alumina washed four times with 500 ml portions of water. The washed alumina was then dried overnight in a vacuum oven at 110° C.

The foregoing procedure was repeated in a series of treatments with 4.2 normal and 0.042 normal NaOH solutions, with 50 ml of catalyst and 350 ml of 0.15 normal NaOH, 0.15 normal KOH, and 0.15 normal LiOH, and with Alcoa F-1 alumina. The Kaiser A-201 alumina untreated contained 0.20 wt. percent sodium. After caustic treatment, washing and drying, this alumina treated with 0.42 normal NaOH contained 0.68 wt. percent sodium. The alumina treated with 4.2 normal NaOH contained 1.02 wt. percent sodium. The alumina treated with 0.042 normal NaOH contained 0.30 wt. percent sodium.

For comparison, 10 ml of catalyst prepared as described in the foregoing or unmodified alumina catalyst of the indicated type and 30 ml of alcohol were placed in a 200 ml round bottom flask equipped with a hand operated stirrer with a teflon blade. The flask was immersed in an oil bath, the temperature of which was 250° C. The mixture in the flask was stirred briefly every five minutes for a 1-hour contact period. The flask was then removed from the oil bath, allowed to cool to room temperature, heated if necessary to permit filtering, then filtered with a 0.1 micron filter to remove catalyst fines. The alcohol used was a cut of synthetic normal alcohol produced by the Ziegler process of chain growth with ethylene on trialkyl aluminum, air oxidation of the resulting aluminum alkyls, hydrolysis of the oxidized aluminum alkyls, topping distillation of light ends and water, preliminary hydrogenation and final distillation. The alcohol was approximately 40 wt. percent $C_{14}$, 40 wt. percent $C_{16}$ and 20 wt. percent $C_{18}$.

The treated alcohol was then analyzed for diols and ethers. Data show noticeable reduction in diol content, the ether content of samples receiving treatment with preferred catalysts being desirably low.

Diols preferably are analyzed via thin layer chromatography (TLC). Alcohols to be analyzed and a standard solution containing a known amount of standard diol, dodecane-1,12-diol, are spotted on a silica gel coated TLC plate. The plates are then eluted with hexane-ethyl acetate solution. After drying, the spots are developed by charring with fuming sulfuric acid. Quantiative results are obtained by comparing the intensity and size of the spots from the alcohol sample with the spots from the standard solution.

Ether analysis is performed by any suitable procedure. The following adsorption chromatography/gas chromatography procedure is useful especially with samples containing low levels of ethers.

A 1.4×40 cm glass column with a No. 4 Teflon stopcock is packed with a slush of 25 ml of Woelm Silica Gel, Activity Grade I, for adsorption chromatography, in n-hexane. A 500 mg sample of alcohol to be analyzed for ether content is diluted with approximately 1 ml of n-hexane, and is loaded on the column and eluted with n-hexane. After 125 ml of hexane is collected the solvent is switched to 20 percent benzene in n-hexane and 240 ml is collected. The solvent is evaporated on a warm hot plate with the assistance of a stream of nitrogen. The solvent is evaporated just to dryness. Excessive heating results in loss of lighter ethers. VPC analysis on a 16'×⅛" stainless steel column packed with 10 percent SE-52 on chromosorb-W, 80/100 mesh, indicates hydrocarbons in the hexane fraction and indicates ethers in the 20 percent benzene in hexane fraction. If more than 240 ml of 20 percent benzene in hexane is collected, some non-ether peaks usually are observed.

Quantitative determinations of dialkyl ethers were conducted by adding a weighed amount of a known ether, that is not present in the sample to be analyzed, as an internal standard to the sample before passing it through the silica gel column. Factors between authentic ether samples were determined and then applied in calculations relating to the internal standard.

Data are presented in Table I.

EXAMPLE II

Example I was repeated using as alumina Kaiser-201, 0.42 normal NaOH, and an oxo alcohol (Shell Neodol 45), which is approximately 70 wt. percent $C_{14}$ and 30 wt. percent $C_{15}$. Data are presented in Table II showing the results of alcohol treatment using untreated alumina and treated alumina. It is evident that the process works to produce a product having less diol and that the ether is less when using the treated catalyst rather than with the untreated catalyst.

TABLE I - Ziegler Alcohol

|  | Wt. Percent | |
|---|---|---|
|  | Diol | Ether |
| Starting Alcohol | 1.53 | nil |
| Kaiser A-201 - NaOH Treated | | |
| Control (unmodified) | 0.14 | 0.17 |
| 4.2 Normal NaOH | 0.14 | 0.0048 |
| 0.42 Normal NaOH | 0.11 | 0.038 |
| 0.Q42 Normal NaOH | 0.10 | 0.15 |
| KaiserA-201 - Various Hydroxides | | |
| Control (unmodified) | 0.05 | 0.69 |

TABLE I - Ziegler Alcohol-continued

|  | Wt. Percent | |
|---|---|---|
|  | Diol | Ether |
| 0.15 Normal NaOH | 0.09 | 0.031 |
| 0.15 Normal KOH | 0.09 | 0.022 |
| 0.15 Normal LiOH | 0.14 | 0.024 |
| Kaiser A-201 - NaOH Treated | | |
| Control (unmodified) | 0.06 | 0.35 |
| 0.42 Normal NaOH | 0.11 | 0.018 |
| Alcoa F-1 - NaOH Treated | | |
| Control (untreated) | 0.09 | 0.16 |
| 0.42 Normal NaOH | 0.24 | 0.0064 |

TABLE II - Oxo Process Alcohol

|  | Wt. Percent | |
|---|---|---|
|  | Diol | Ether |
| Starting Alcohol | 0.36 | nil |
| Kaiser A-201 - NaOH Treated | | |
| A-201 (untreated | 0.17 | 0.20 |
| A-201 (0.42 Normal NaOH) | 0.19 | 0.0020 |

EXAMPLE III

Apparatus was set up as in the Figure. The dehydrator 14 was operated at temperatures as indicated in the following tables and at 500 psig with a liquid hourly space velocity (LHSV) of 0.64. Catalyst used was Kaiser 201-A alumina. For the comparative runs, untreated catalyst was used. Where the catalyst was used in the treated form, the treatment was that described in Example I, the alkali metal hydroxide treatment solution being 0.42 normal NaOH. Except for III-C no hydrogen was fed to the dehydrator.

In the runs where hydrogenation was used, only hydrogenator 18 was used and it was packed with pelletized nickel catalyst (Harshaw Ni-0104T-⅛" pellets). Reduction temperature was 121° C., pressure 500 psig, hydrogen excess, LHSV 1.0.

The following data show that the alumina catalyst modified with caustic provides effective diol reduction and less ether formation than the unmodified catalyst.

Example III-A

| Alcohol (Wt. Percent) | Feed | Unmodified Catalyst | | Modified Catalyst Dehydrated and Hydrogenated |
|---|---|---|---|---|
| | | Dehydrated Only | Dehydrated and Hydrogenated | |
| $C_{10}$ and below | — | 0.1 | 1.7 | 1.2 |
| $C_{12}$ | 65.2 | 66.0 | 63.9 | 65.4 |
| $C_{14}$ | 22.3 | 22.4 | 22.2 | 22.6 |
| $C_{16}$ | 9.6 | 8.4 | 8.5 | 8.8 |
| $C_{18}$ | 0.1 | 0.1 | — | 0.2 |
| Temperature of Dehydration (° C.) | — | 218° C. | 218° C. | 215° C. |
| Diol (Wt. percent) | 0.31 | 0.07 | 0.05 | 0.05 |
| Alkyl Ether (Wt. percent) | — | 0.14 | 0.33 | 0.094 |

Example III-B

| Alcohol (Wt. Percent) | Feed | Unmodified Catalyst | | Modified Catalyst Dehydrated and Hydrogenated |
|---|---|---|---|---|
| | | Dehydrated Only | Dehydrated and Hydrogenated | |
| $C_{10}$ and below | — | — | 0.1 | — |
| $C_{12}$ | 0.5 | 0.6 | 0.6 | 0.5 |

Example III-B-continued

| Alcohol (Wt. Percent) | Feed | Unmodified Catalyst Dehydrated Only | Unmodified Catalyst Dehydrated and Hydrogenated | Modified Catalyst Dehydrated and Hydrogenated |
|---|---|---|---|---|
| $C_{14}$ | 38.3 | 36.5 | 37.3 | 32.6 |
| $C_{16}$ | 37.6 | 36.8 | 36.7 | 37.3 |
| $C_{18}$ | 19.1 | 19.4 | 18.7 | 22.7 |
| $C_{20}$ | 0.9 | 1.2 | 1.1 | 1.3 |
| Temperature of Dehydration (° C.) | — | 240–265 | 250 | 250 |
| Diol (Wt. percent) | 1.53 | 0.09 | 0.09 | 0.09 |
| Alkyl Ether (Wt. percent) | — | 1.8 | 1.2 | 0.32 |

EXAMPLE III-C

| Alcohol (Wt. Percent) | Feed | Unmodified Catalyst Dehydrated Only | Unmodified Catalyst Dehydrated and Hydrogenated | Modified Catalyst Dehydrated and Hydrogenated | Modified Catalyst Hydrogen Fed During Dehydration Then Hydrogenated as in Other Examples |
|---|---|---|---|---|---|
| $C_{12}$ | | | 0.1 | 0.1 | 0.1 |
| $C_{14}$ | 1.5 | 1.6 | 1.8 | 1.1 | 1.0 |
| $C_{16}$ | 42.1 | 41.2 | 40.7 | 42.5 | 42.8 |
| $C_{18}$ | 46.6 | 46.7 | 45.9 | 47.0 | 47.5 |
| $C_{20}$ | 2.0 | 2.2 | 2.2 | 2.1 | 2.0 |
| Temperature of Dehydration (° C) | | 250 | 260 | 250 | 250 |
| Diol (Wt. percent) | 0.72 | 0.08 | 0.07 | 0.06 | 0.09 |
| Alkyl Ether (Wt. percent) | — | 1.2 | 1.7 | 0.20 | 0.17 |

Example III-D

Wide Range Alcohols ($C_{6-24}$) - (250° C.)

| Alcohol (Wt. Percent) | Feed | Unmodified Catalyst Dehydrated and Hydrogenated | Modified Catalyst Dehydrated and Hydrogenated |
|---|---|---|---|
| Diol (Wt. percent) | 0.52–0.55 | 0.08 | 0.08 |
| Alkyl Ether (Wt. percent) | nil | 0.54 | 0.27 |

We claim:

1. A process for treating alcohol containing at least an impurity amount of radicals of the type (>CHOH) to provide a product having a lesser amount of (>CHOH) radicals which comprises, contacting said alcohol at a temperature of from about 200° to about 300° C., in the liquid phase with an uncalcined alkali metal hydroxide treated alumina catalyst.

2. The process of claim 1, wherein the uncalcined alkali metal hydroxide treated alumina catalyst is prepared by treating an alumina catalyst with an aqueous alkali metal hydroxide at a temperature up to about 150° C.

3. The process of claim 2, wherein the aqueous alkali metal hydroxide is a solution from about 0.1 to about 10 normal to about a saturated solution.

4. The process of claim 2, wherein the aqueous alkali metal hydroxide is used in an amount sufficient to cover the alumina catalyst without requiring agitation.

5. The process of claim 1, wherein the uncalcined alkali metal hydroxide treated alumina catalyst is prepared by contacting an alumina catalyst with a sufficient amount of an aqueous alkali metal hydroxide to react with a desired fraction of active sites of the alumina catalyst and for a period of time sufficient to allow the reaction to occur.

6. The process of claim 5, wherein after the alumina catalyst has been contacted with the desired amount of aqueous alkali metal hydroxide, the so treated catalyst is washed to remove residual free alkali metal hydroxide and then dried at a temperature up to about 200° C.

7. The process of claim 6, wherein the so treated catalyst is washed with water and then dried to remove residual water.

8. A process for purifying alcohol containing the radicals (—CH$_2$OH) and (>CHOH), at least some alcohol molecules present having both radicals present therein to provide a product having a lesser amount of (>CHOH) radicals which comprises, contacting said alcohol at a temperature of from about 200° to about 300° C., in the liquid phase with an uncalcined alkali metal hydroxide treated alumina catalyst.

9. In a process for purifying predominantly primary alkanol containing the radicals (—CH$_2$OH) and some radicals of the type (>CHOH) obtained by hydrolyzing an air-oxidized mixture of aluminum alkyls produced by growing aluminum triethyl in the presence of ethylene to provide an alcohol product with reduced quantities of dihydroxy compounds having the radicals (>CHOH) the improvement which comprises contacting said primary alcohol at a temperature of from about 200° to about 300° C. in the liquid phase with an uncalcined alkali metal hydroxide treated alumina catalyst.

10. A process in accordance with claim 2 wherein the treated alumina catalyst is of the gamma type.

11. A process in accordance with claim 1 wherein the alcohol treated has from about 4 to about 30 carbon atoms per molecule.

12. A process in accordance with claim 1 wherein the alcohol is subjected to hydrogenation concurrently with the treatment or subsequent thereto to reduce the iodine value of the alcohol.

13. A process in accordance with claim 12 wherein the hydrogenation is subsequent to the treatment and is with a nickel catalyst at a temperature of from about 115° to about 140° C. and a pressure of from about 300 to about 500 psia.

14. A process in accordance with claim 2 wherein the amount of alkali metal hydroxide used in the treating of the alumina catalyst is at least enough to inactivate a substantial portion of the active acid sites of the alumina.

15. A process in accordance with claim 2 wherein the alkali metal hydroxide is sodium hydroxide or potassium hydroxide.

* * * * *